US008667420B2

(12) United States Patent
Schmitlin et al.

(10) Patent No.: US 8,667,420 B2
(45) Date of Patent: Mar. 4, 2014

(54) TECHNIQUES FOR PRESENTING AND BROWSING HIERARCHICAL DATA

(75) Inventors: Benoit Schmitlin, Seattle, WA (US); Sander Martijn Viegers, Seattle, WA (US); Chris Edwards, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 973 days.

(21) Appl. No.: 12/340,774

(22) Filed: Dec. 22, 2008

(65) Prior Publication Data

US 2010/0162173 A1   Jun. 24, 2010

(51) Int. Cl.
*G06F 3/048* (2013.01)

(52) U.S. Cl.
USPC ............ 715/853; 715/821; 715/823; 715/854

(58) Field of Classification Search
USPC ......... 715/853, 854, 817, 821, 823, 788, 798; 345/649
See application file for complete search history.

(56) References Cited

U.S. PATENT DOCUMENTS

| | | | |
|---|---|---|---|
| 6,496,208 B1 | 12/2002 | Bernhardt et al. | |
| 6,944,830 B2* | 9/2005 | Card et al. | 715/853 |
| 7,350,144 B2 | 3/2008 | Burg et al. | |
| 7,363,593 B1 | 4/2008 | Loyens et al. | |
| 7,657,848 B2* | 2/2010 | Yakowenko et al. | 715/853 |
| 7,669,141 B1* | 2/2010 | Pegg | 715/781 |
| 7,712,043 B2* | 5/2010 | Li et al. | 715/781 |
| 2003/0063126 A1* | 4/2003 | Yanchar et al. | 345/781 |
| 2004/0119760 A1* | 6/2004 | Grossman et al. | 345/854 |
| 2004/0215657 A1* | 10/2004 | Drucker et al. | 707/104.1 |
| 2005/0050477 A1* | 3/2005 | Robertson et al. | 715/853 |
| 2008/0091441 A1* | 4/2008 | Flammer et al. | 705/1 |
| 2008/0235568 A1 | 9/2008 | Malkin et al. | |
| 2009/0150066 A1* | 6/2009 | Grason et al. | 701/202 |
| 2010/0251162 A1* | 9/2010 | Stallings et al. | 715/777 |

OTHER PUBLICATIONS

Johnson, et al., "Tree-Maps: A Space-Filling Approach to the Visualization of Hierarchical Information Structures", retrieved at http://ieeexplore.ieee.org/stamp/stamp.jsp?arnumber=00175815, IEEE, pp. 284-291.

Lamping, et al., "A Focus+Context Technique Based on Hyperbolic Geometry for Visualizing Large Hierarchies.", retrieved at <<http://www.cs.tau.ac.il/~asharf/shrek/Projects/HypBrowser/startree-chi95.pdf>>, Proceedings of the ACM SIGCHI, Conference on Human Factors in Computing Systems, Denver, May 1995, pp. 1-8.

(Continued)

*Primary Examiner* — Kieu Vu
*Assistant Examiner* — Blaine Basom
(74) *Attorney, Agent, or Firm* — Tom Wong; Jim Ross; Micky Minhas

(57) ABSTRACT

Various technologies and techniques are disclosed for presenting and browsing hierarchical data. A hierarchical chart is displayed with a primary entity being displayed in a center region of the display. One or more peers to the primary entity are displayed along a horizontal axis in comparison to the primary entity. One or more parents to the primary entity are displayed above the primary entity, and one or more children to the primary entity are displayed beneath the primary entity. A method for performing searches against a hierarchical chart is also described. Input is received for a name to search for in a hierarchical chart. A filter criteria selection is received. A search is performed against the hierarchical chart to find one or more matching records that match the name and the filter criteria. The one or more matching records are displayed, with at least a name and photo.

20 Claims, 18 Drawing Sheets

(56) References Cited

OTHER PUBLICATIONS

Robertson, et al., "Animated Visualization of Multiple Intersecting Hierarchies", retrieved at <<http://research.microsoft.com/~marycz/IV2002poly.pdf>>, Journal of Information Visualization, vol. 1, No. 1, Mar. 2002, pp. 1-23.

* cited by examiner

TECHNIQUES FOR PRESENTING AND BROWSING HIERARCHICAL DATA

BACKGROUND

Organizational charts are often used to show hierarchies of relationships between entities, such as between people or teams within a company. It is often difficult to represent a perspective of the entire organization as a whole while also showing details of a specific entity on the chart. This is especially true in large organizations where there are dozens, if not hundreds of entities to represent on the organization chart. In such scenarios, when displaying the details of a particular entity, it is typically difficult to also provide enough information about the peer, child, and parent entities.

SUMMARY

Various technologies and techniques are disclosed for presenting and browsing hierarchical data. A hierarchical chart is displayed with a primary entity being contained in a center region of the display, such as in a contact card. One or more peers to the primary entity are displayed along a horizontal axis in comparison to the primary entity, such as in a vertical orientation. One or more parents to the primary entity are displayed above the primary entity, and one or more children to the primary entity are displayed beneath the primary entity. In one implementation, animations are used to graphically indicate when a different entity is being transitioned to become the primary entity.

In one implementation, a method for performing searches against a hierarchical chart is also described. Input is received for a name to search for in a hierarchical chart. A filter criteria selection is received. A search is performed against the hierarchical chart to find one or more matching records that match the name and the filter criteria. The one or more matching records are displayed, with at least a name and photo.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
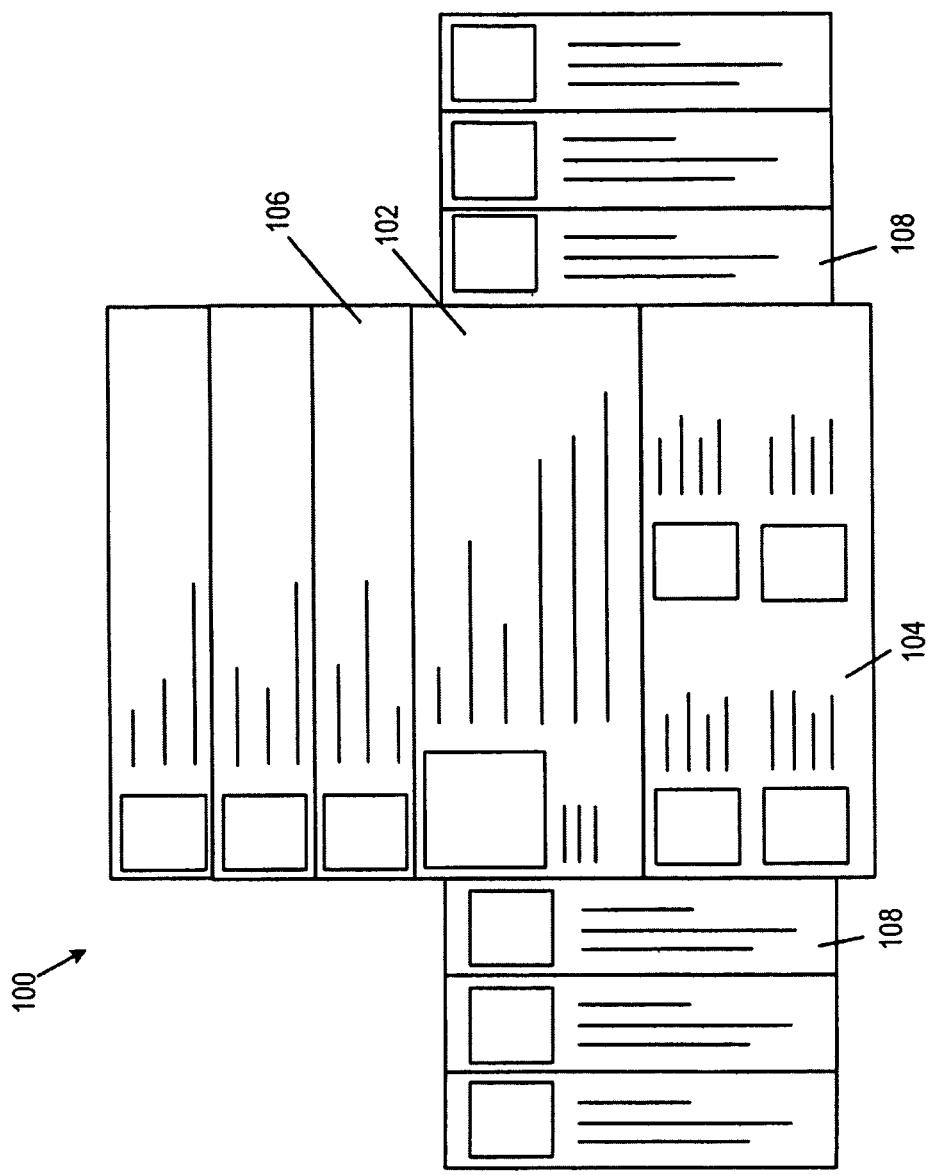
FIG. 1 is a diagrammatic view of a graphical layout for displaying hierarchical charts of one implementation.

The technologies and techniques herein may be described in the general context as an application that displays and/or manages hierarchical charts, but the technologies and techniques also serve other purposes in addition to these. In one implementation, one or more of the techniques described herein can be implemented as features within program such as MICROSOFT® Office SharePoint Server, or from any other type of program or service that displays and/or manages hierarchical charts.

In one implementation, techniques are described for displaying hierarchical charts in a graphical way that show details about a primary entity, along with enough information about the primary entity's peer, children, and parent entities to give a context about the relationships between them. The term "hierarchical chart" as used herein is meant to include a representation of hierarchical data. A few non-limiting examples of hierarchical data includes relationships between people within a company, and/or relationships between roles/disciplines. Another non-limiting example of hierarchical data includes positions within a company (including filled and/or unfilled positions). Yet another non-limiting example of hierarchical data includes locations, regions, and/or countries. And yet another non-limiting example of hierarchical data includes colleges, classes, projects, and/or groups. Numerous other types of hierarchical data can also be represented in a hierarchical chart using some or all of the techniques described herein.

The term "entity" as used herein is meant to include a person, team, company, product category, or other identifiable entity or thing that can have hierarchical relationships with other entities. The term "primary entity" as used herein is meant to include an entity that is being displayed with a higher level of attention and/or detail than other related entities. For example, in the case of a hierarchical chart that is displaying people in a particular company, the primary entity might be a particular person at the company, such as John Doe, whose details are being displayed as the focal point of the display.

The terms "peer" and "peer entity" as used herein are meant to include an entity that is contained at the same level in a hierarchy. In the case of people being displayed in a hierarchical chart, a peer entity could be a co-worker who is at the same level in the organization as the primary entity that is displayed. The term "parent" and "parent entity" as used herein are meant to include an entity that is contained at a higher level in a hierarchy as the primary entity. An example of a parent entity includes one or more managers above the primary entity within an organization. The term "child" and "child entity" as used herein is meant to include an entity that is contained at a lower level in a hierarchy as the primary entity. An example of this includes people who report to the primary entity.

While the examples used herein focus on describing hierarchical charts that represent people or teams within an organization, it will be appreciated that any type of hierarchical structure that has relationships between entities can take advantage of some or all of these techniques.

Turning now to FIG. 1, a diagrammatic view 100 of a graphical layout for displaying hierarchical charts of one implementation is described. In the example layout shown, a primary entity 102 is displayed in a center region of the screen. The primary entity is surrounded by parent entities 106, child entities 104, and peer entities 108. In this example, each of the entities being displayed have a photo, name, and other details about the respective entity. When a photo is not available for a given entity, a placeholder photo can be displayed, or photos may not be used at all. In other implementations, additional, fewer, and/or other details may be shown for some or all of the entities.

While the examples herein describe a primary entity as having one or more parent(s), child(ren), and/or peer(s), it will be appreciated that primary entities may have fewer and/or additional parent(s), child(ren), and/or peer(s) than those specifically illustrated in these examples. For example, when the primary entity is the CEO of the company, he/she may not have a parent entity. When the primary entity is an intern, he/she may not have child entities. These are just a few examples to illustrate the concept of how peer, child, and parent entities can also vary in quantity.

In the example shown in FIG. 1, one or more parent entities 106 are displayed above the primary entity 106. Peer entities 108 are displayed along a horizontal axis in relationship to the primary entity 102. As one non-limiting example, details describing these peer entities 108 can have a vertical orientation, as shown on FIG. 1, or another orientation. Child entities 104 are displayed beneath the primary entity 102. In one implementation, each entity represented on the screen at a given time is displayed in a contact card. The term "contact card" as used herein is meant to include a defined region that contains information about a particular entity, such as one visually indicated with a box or other perimeter that surrounds the particular entity.

In one implementation, while child entities 104 are displayed beneath the primary entity 102, they are included as part of an overall contact card of the primary entity 102. Other variations are also possible where child entities 104 are not part of an overall contact card of the primary entity 102.

Figure 2:
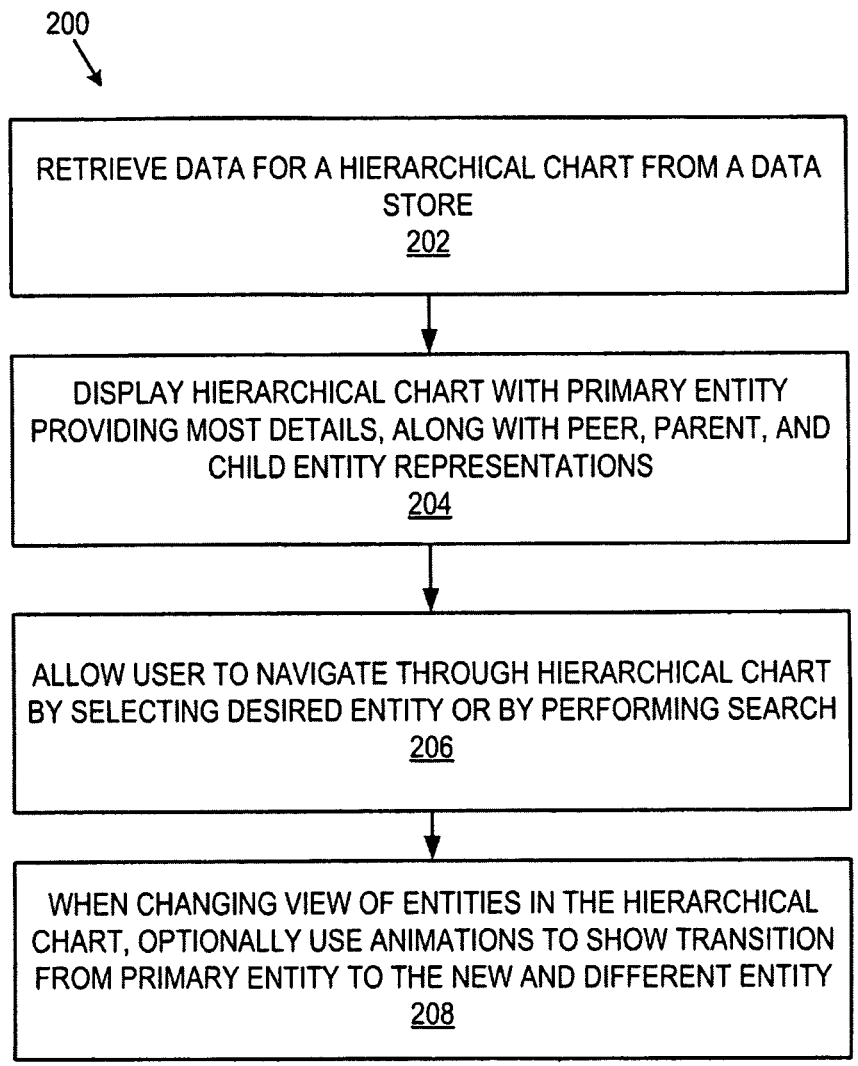
FIG. 2 is a process flow diagram for one implementation illustrating the stages involved in graphically representing a hierarchical chart that shows a center contact card along with parent, child, and peer entity relationships.
Figure 3:
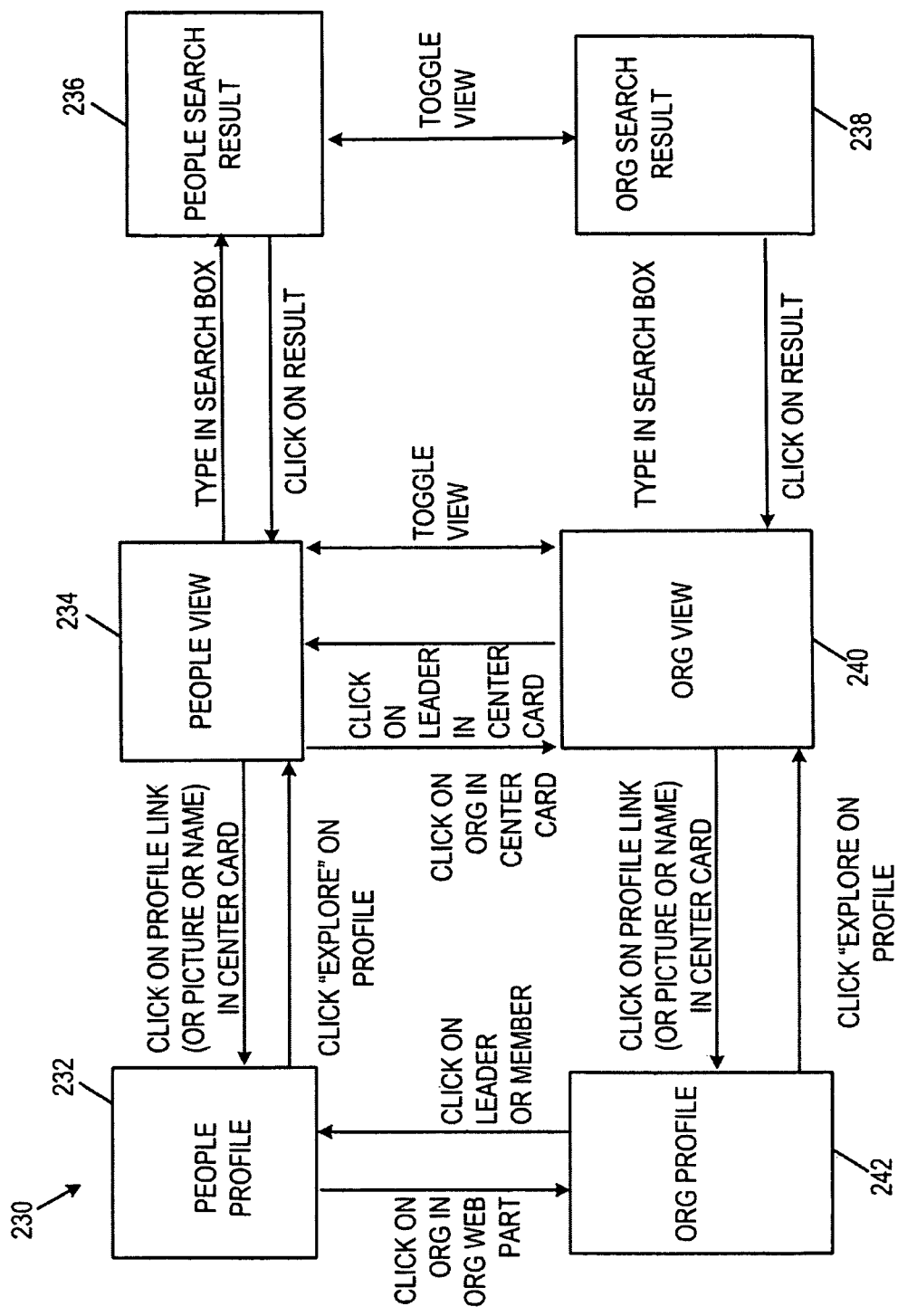
FIG. 3 is a diagrammatic view in one implementation showing a model of possible interactions that the user can experience when navigating a hierarchical chart.
Figure 4:
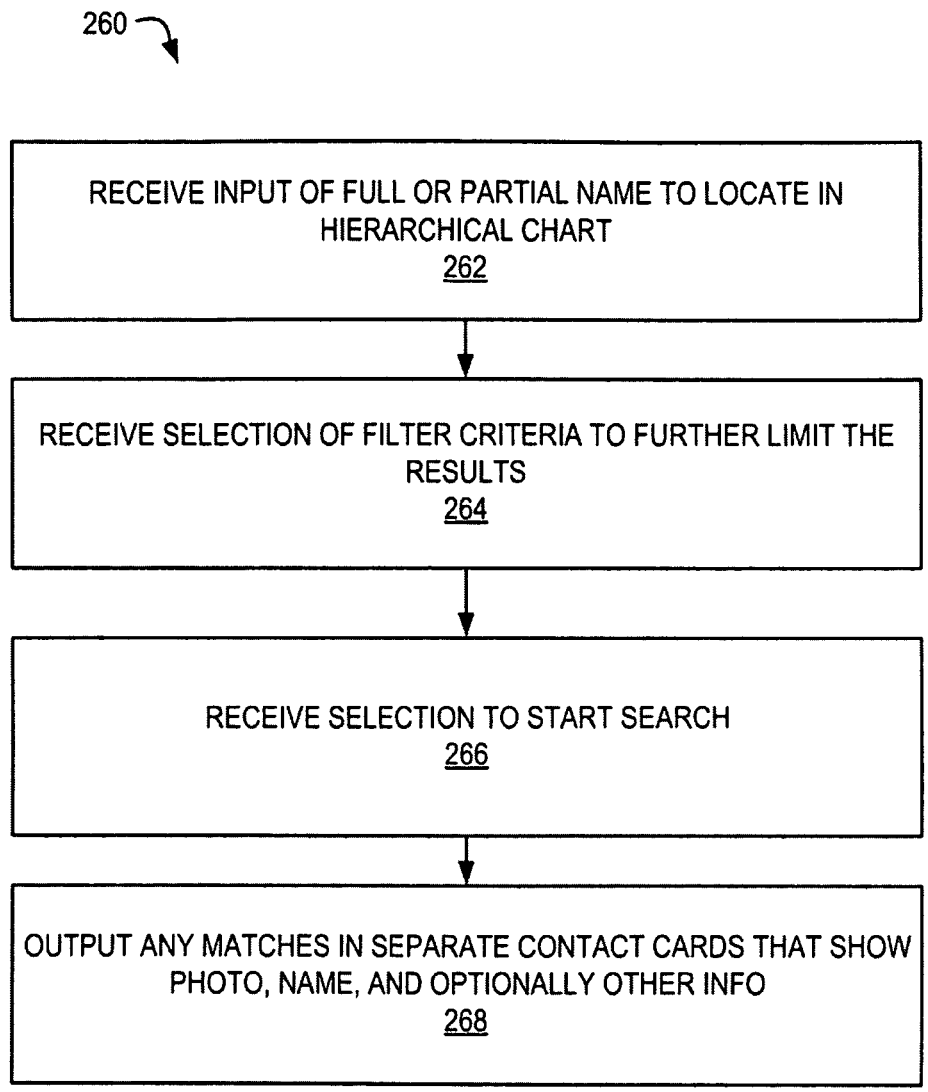
FIG. 4 is a process flow diagram for one implementation illustrating the stages involved in performing a search against a hierarchical chart to locate an entity of interest.

Turning now to FIGS. 2-4, the stages for implementing one or more implementations for displaying and/or managing hierarchical charts are described in further detail. In some implementations, the processes of FIG. 2-4 are at least partially implemented in the operating logic of computing device 500 (of FIG. 18).

FIG. 2 is a process flow diagram 200 that illustrates one implementation of the stages involved in graphically representing a hierarchical chart that shows a center contact card along with parent, child, and peer entity relationships. Data is retrieved for a hierarchical chart from a data store (stage 202). The hierarchical chart is displayed with a primary entity in the center providing the most details, along with peer, parent, and child entity representations (stage 204). The user can navigate through the hierarchical chart by selecting a desired entity, or by performing a search to locate a particular entity that is not currently on the screen (stage 206). When the view of entities is being changed in the hierarchical chart, animations can be used to show the transition from the primary entity to the new and different entity. These interactions and animations are explained in further detail in FIGS. 3-17.

Figure 5:
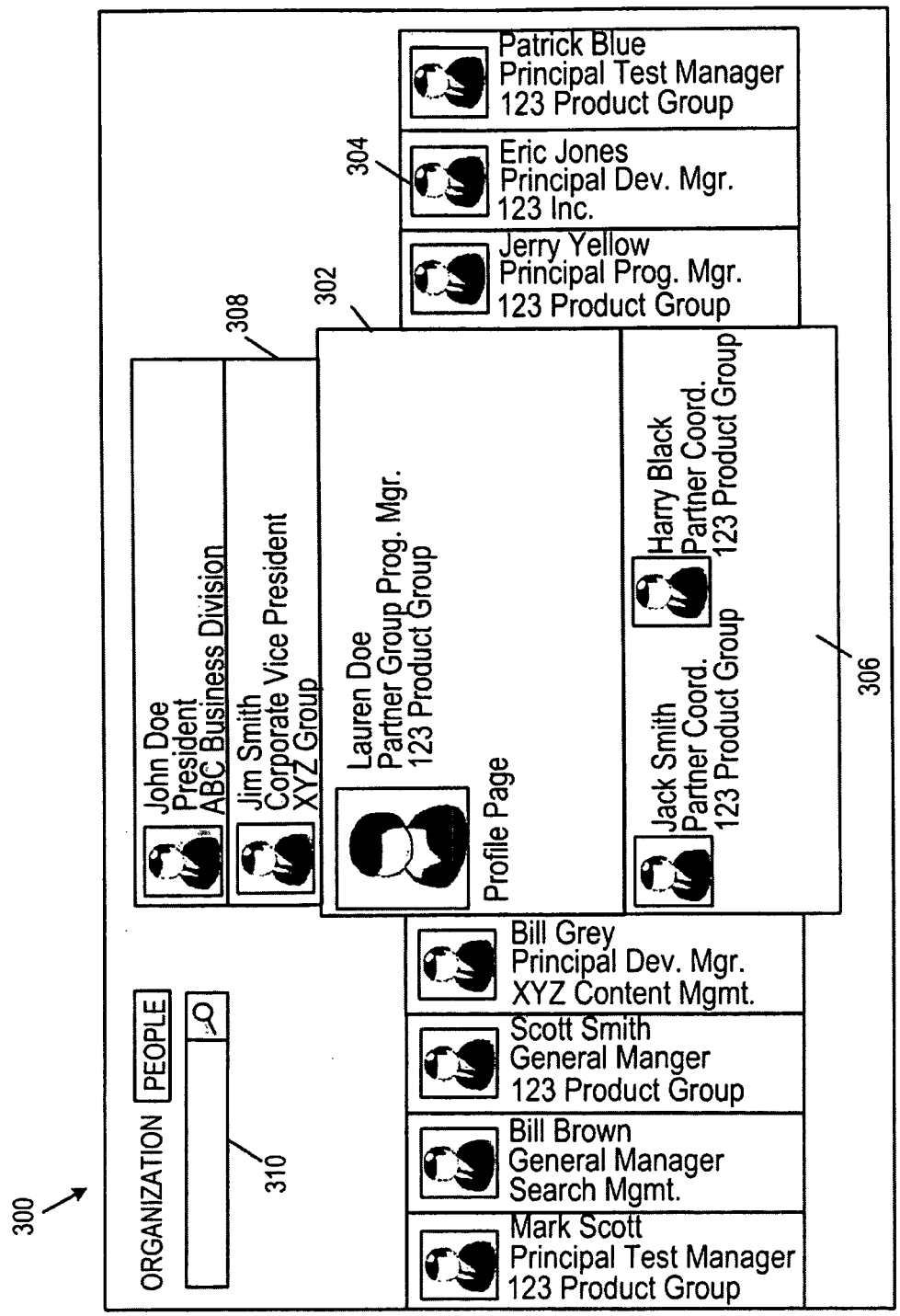
FIG. 5 is a simulated screen for one implementation that illustrates an example hierarchical chart that shows entities and their relationships by people, with a particular contact card having the center focus.
Figure 6:
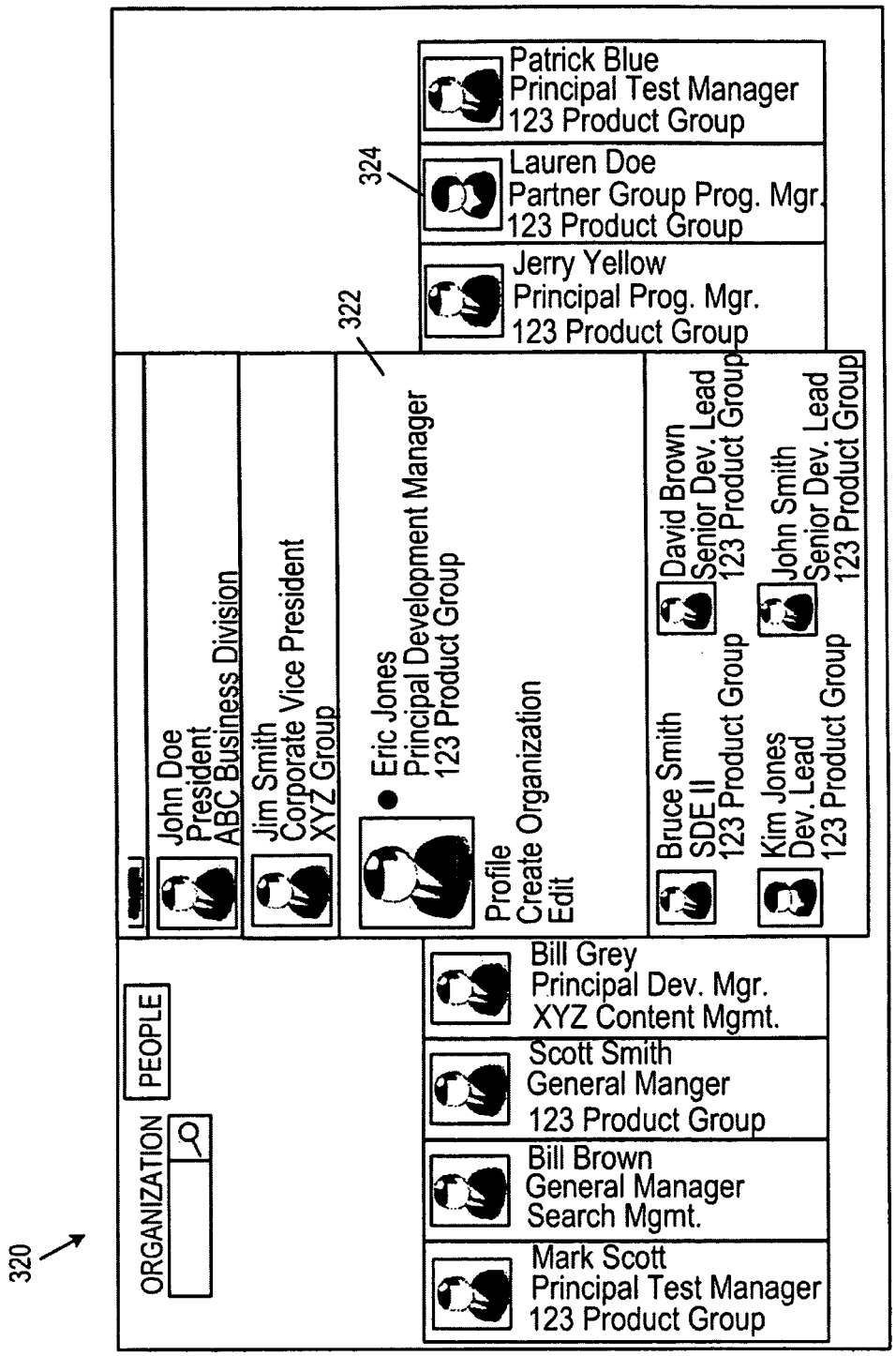
FIG. 6 is a simulated screen for one implementation that illustrates a peer to the primary entity shown in FIG. 5 has now become the primary entity.
Figure 7:
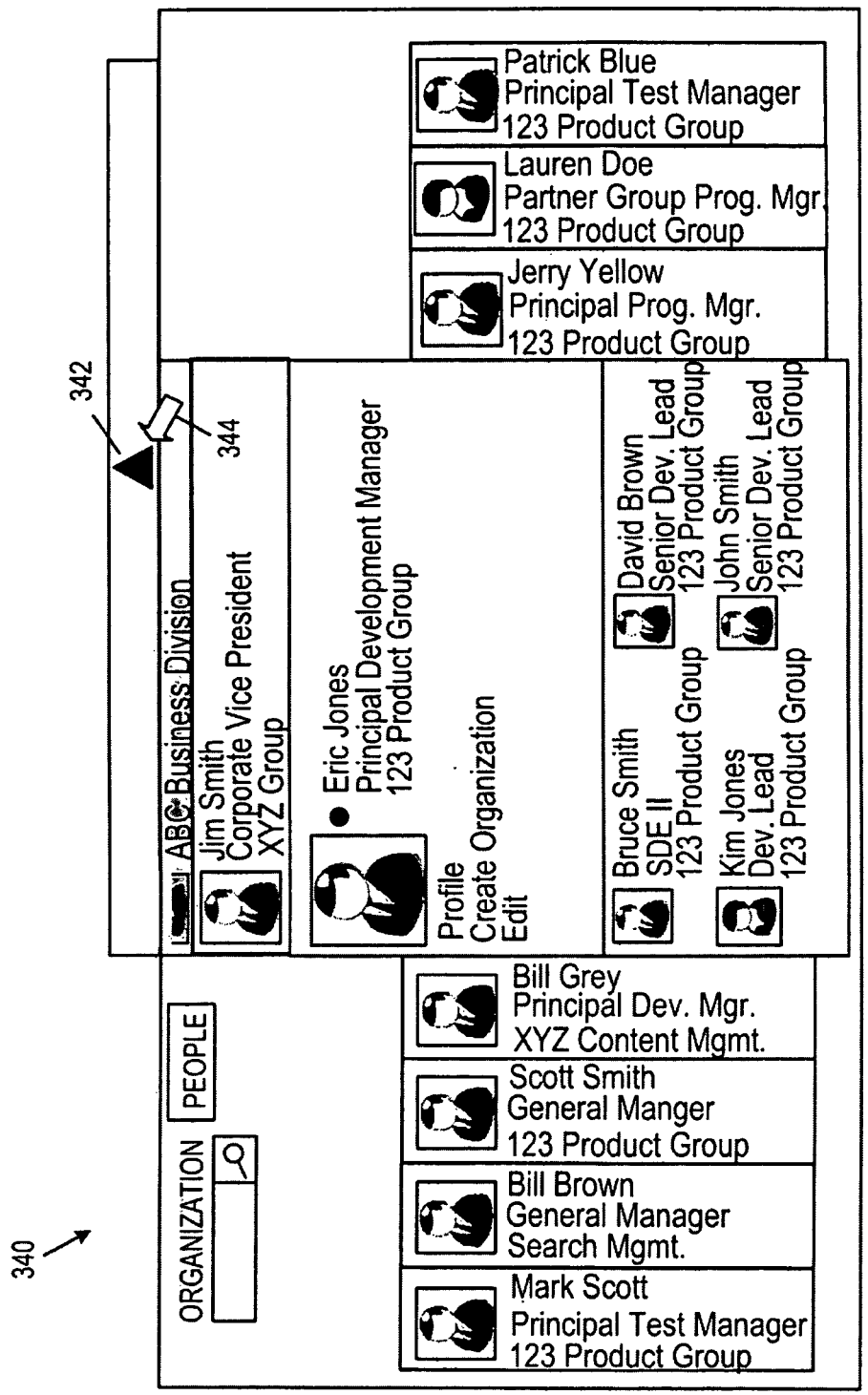
FIG. 7 is a simulated screen for one implementation that illustrates a scrolling mechanism to allow users to move up the hierarchical chart when a portion of the chart is cut off from the current display.

FIG. 3 is a diagrammatic view 230 for one implementation showing a model of possible interactions that the user can experience when navigating a hierarchical chart. This example is directed to navigating among a people view versus an organizational view, but other implementations could use entities other than people and/or organizations. When a user clicks on a people profile 232 (such as a contact card), then a people view 234 is shown. In the people view 234, the selected person displayed as the primary entity in a center contact card, with parent, child, and peer relationships also being represented in some fashion. A few non-limiting examples of a people view 234 are shown in FIGS. 5-7, which will be discussed later. A people search can be performed when the user clicks a name into the search box, and search results 236 are then displayed. Upon clicking in a result in the search results 236, then the view switches back to the people view 234.

Figure 8:
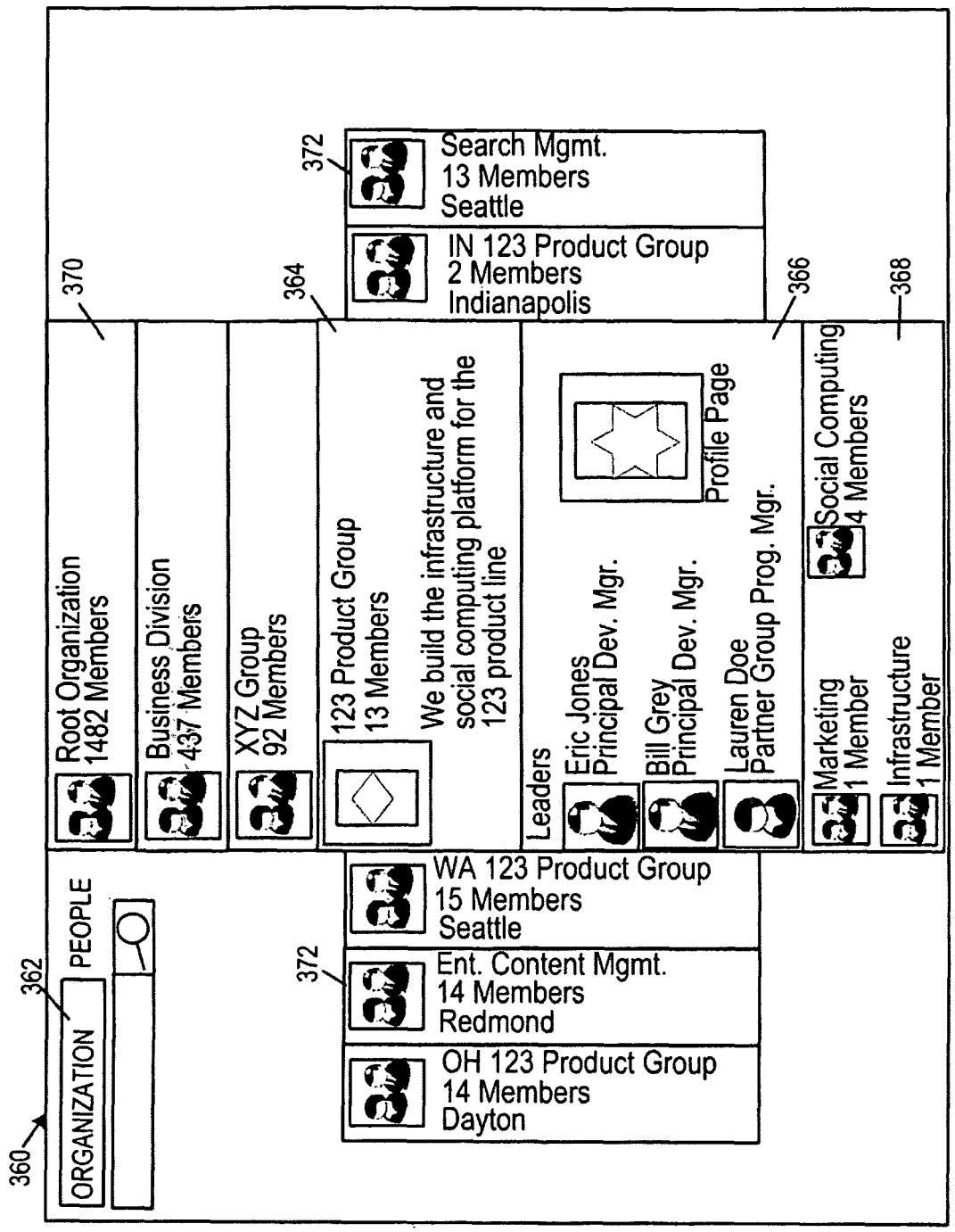
FIG. 8 is a simulated screen for one implementation that illustrates an example hierarchical chart that shows entities and their relationships by organization.

The user can switch from the people profile 232 to the organizational profile 242 by selecting an option to view the hierarchical chart by organization (instead of people), and vice versa. While in the organizational profile 242, a selected entity gets displayed in the organizational view 240 as the primary entity in the center contact card. A non-limiting example of an organizational view is shown in FIG. 8, which will be described later. The parent, child, and peer entities in the organization are also displayed as appropriate. While in the organizational view 240, the user can type in a search box to search for parts of an organization by name, and organizational search results are displayed 238. If a particular result in that search result is selected, then that selected entity is then displayed as the primary entity in the organizational view 240.

In one implementation, from the people view 234, the user can switch to organizational view 240 by selecting an organization name that is displayed as part of the contact card of the primary entity. In another implementation, from the organizational view 240, the user can switch to people view 234 by selecting a leader name in the contact card of the primary entity.

FIG. 4 is a process flow diagram 260 that illustrates one implementation of the stages involved in performing a search against a hierarchical chart to locate an entity of interest. The user can enter a name to search for in the hierarchical chart, and the user's input is received of a full or partial name to locate (stage 262). A selection is optionally received of filter criteria that will be used to further limit the search results (stage 264). An example of additional filter criteria includes a particular team or division within a company to restrict the search so. A selection is received to indicate that the search should be started (stage 266), and the search is then performed. Any records that match the specified criteria are output into separate contact cards that show the photo, name, and/or other information about the particular entities (stage 268). Searching is illustrated in further detail in FIGS. 11 and 12.

Turning now to FIGS. 5-12, simulated screens are shown to illustrate a user interface that shows several examples for displaying hierarchical charts according to the techniques introduced in FIGS. 1-4. These screens can be displayed to users on output device(s) 511 (of FIG. 18). Furthermore, these screens can receive input from users from input device(s) 512 (of FIG. 18).

FIG. 5 is a simulated screen 300 for one implementation that illustrates an example hierarchical chart that shows entities and their relationships by people, with a particular contact card having the center focus. In this example, the primary entity 302 is shown in the center region of the screen, with the peer entities 304, child entities 306, and parent entities 308 being displayed in the surrounding regions. The current view is in people view, and the user can enter search criteria 310 into the search field to locate a person by searching on all or part of a name.

In this example, the primary entity 302 that is shown on the screen is Lauren Doe. Lauren Doe has two people who report to her, which are shown as child entities 306. If Eric Jones, a particular one of Lauren Doe's peer entities 304 is selected, a screen similar to FIG. 6 is then showed with Eric Jones as the primary entity in the center region. FIG. 6 is discussed next.

FIG. 6 is a simulated screen 320 for one implementation that illustrates a peer to the primary entity shown in FIG. 5 has now become the primary entity. In this example, primary entity 322 is "Eric Jones", and one of his peer entities 324 is "Lauren Doe", who was previously the primary entity (on FIG. 5). As further described in FIGS. 13-17, animations can be used to visually indicate when the primary entity is changed from one entity to another.

FIG. 7 is a simulated screen 340 for one implementation that illustrates a scrolling mechanism to allow users to move up the hierarchical chart when a portion of the chart is cut off from the current display. In the example shown, there are more parent entities than can fit on the current display. Thus, an arrow 342 is displayed (such as when the user hovers an input device over the area) to indicate that more parent entities exist. If the user selects arrow 342, such as shown by selector 344, then the display will be adjusted to show some of the entities that are off the screen.

FIG. 8 is a simulated screen 360 for one implementation that illustrates an example hierarchical chart that shows entities and their relationships by organization, as is indicated by organizational view 362. In the case of the organizational view 362, the primary entity 364, child entities 368, parent entities 370, and peer entities 372 provide details about the organization itself. For example, the primary entity 364 in this example is the "123 Product Group". The center contact card for primary entity 364 gives additional details about that team, including how many team members are contained in that team, what the team does, and so on. The leaders 366 of the team are also shown as part of the primary entity 364. In this example, the peer entities 372 are other teams within the organization. Upon selecting one of the leaders 366 of the team, the view can switch to people view with the selected leader shown as the primary entity, such as shown in FIGS. 5-6.

Figure 9:
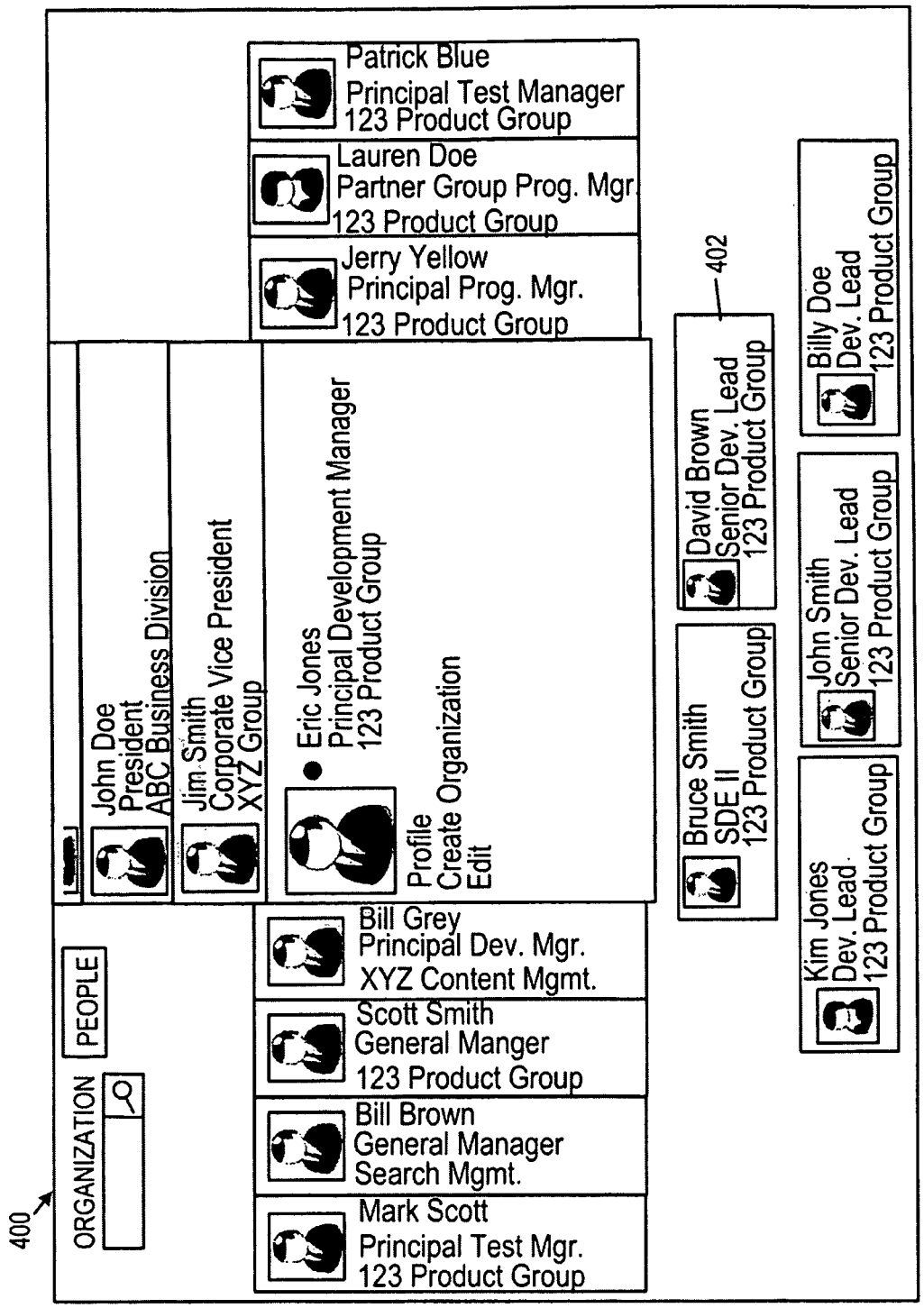
FIG. 9 is a simulated screen for one implementation that illustrates another implementation that shows child entity relationships in separate contact cards that are stacked in a staggered fashion underneath the center contact card.

FIG. 9 is a simulated screen 400 for one implementation that illustrates another implementation that shows child entities 402 in separate contact cards that are stacked in a staggered fashion underneath the center contact card. In alternate implementations, the stacking of child entities 402 in separate contact cards like this can be used instead of making the child entities as part of the same contact card as the primary entity, as shown in some of the earlier examples.

Figure 10:
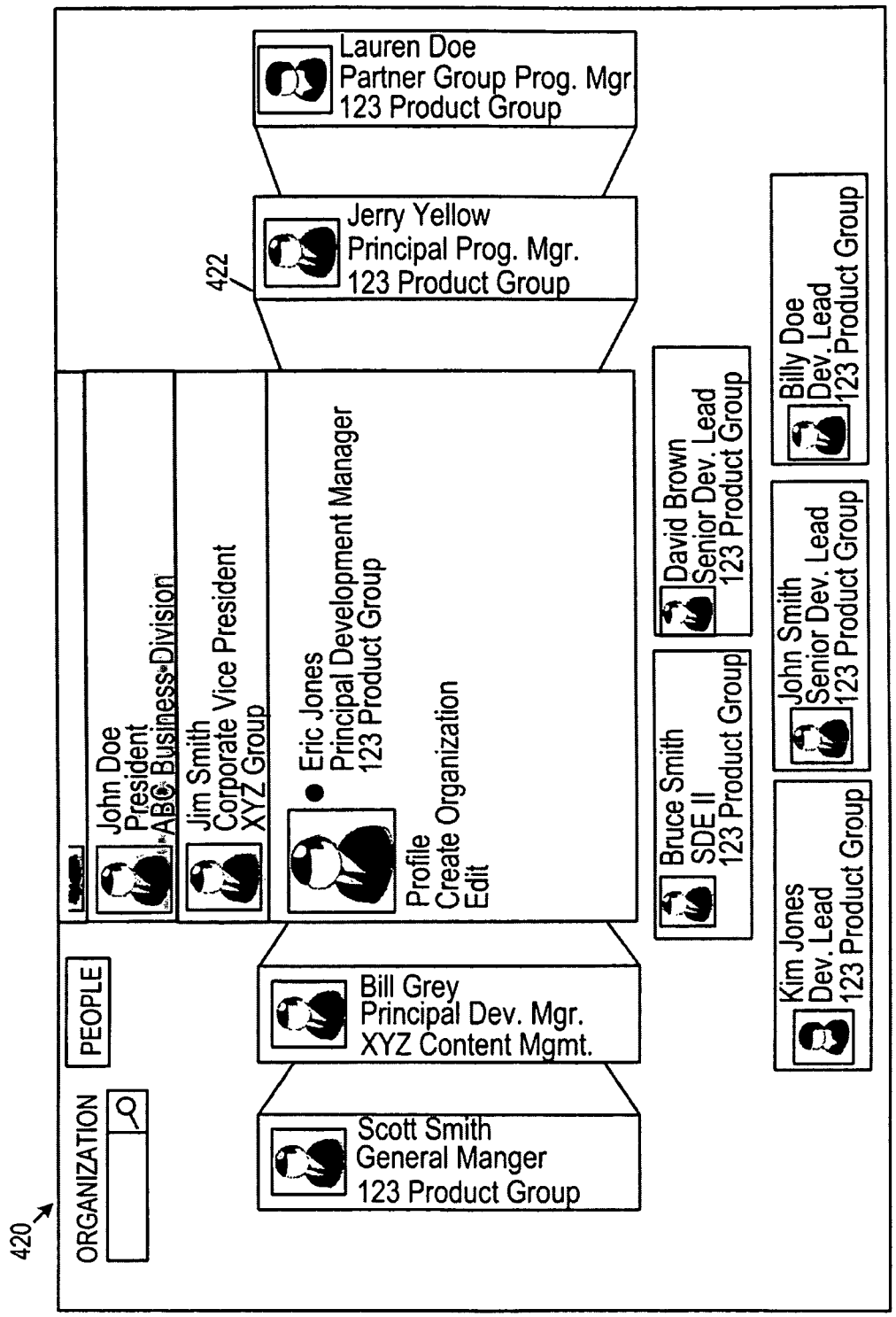
FIG. 10 is a simulated screen for one implementation that illustrates another implementation that shows peer entity relationships in a 3-dimensional manner.

FIG. 10 is a simulated screen 420 for one implementation that illustrates another implementation that shows peer entities 422 in a 3-dimensional manner along a horizontal axis next to the primary entity. FIGS. 9 and 10 are non-limiting examples of other ways that peer, child, and/or parent entities can be arranged in other implementations. Numerous other visual arrangements could also be used than those specifically explained here.

Figure 11:
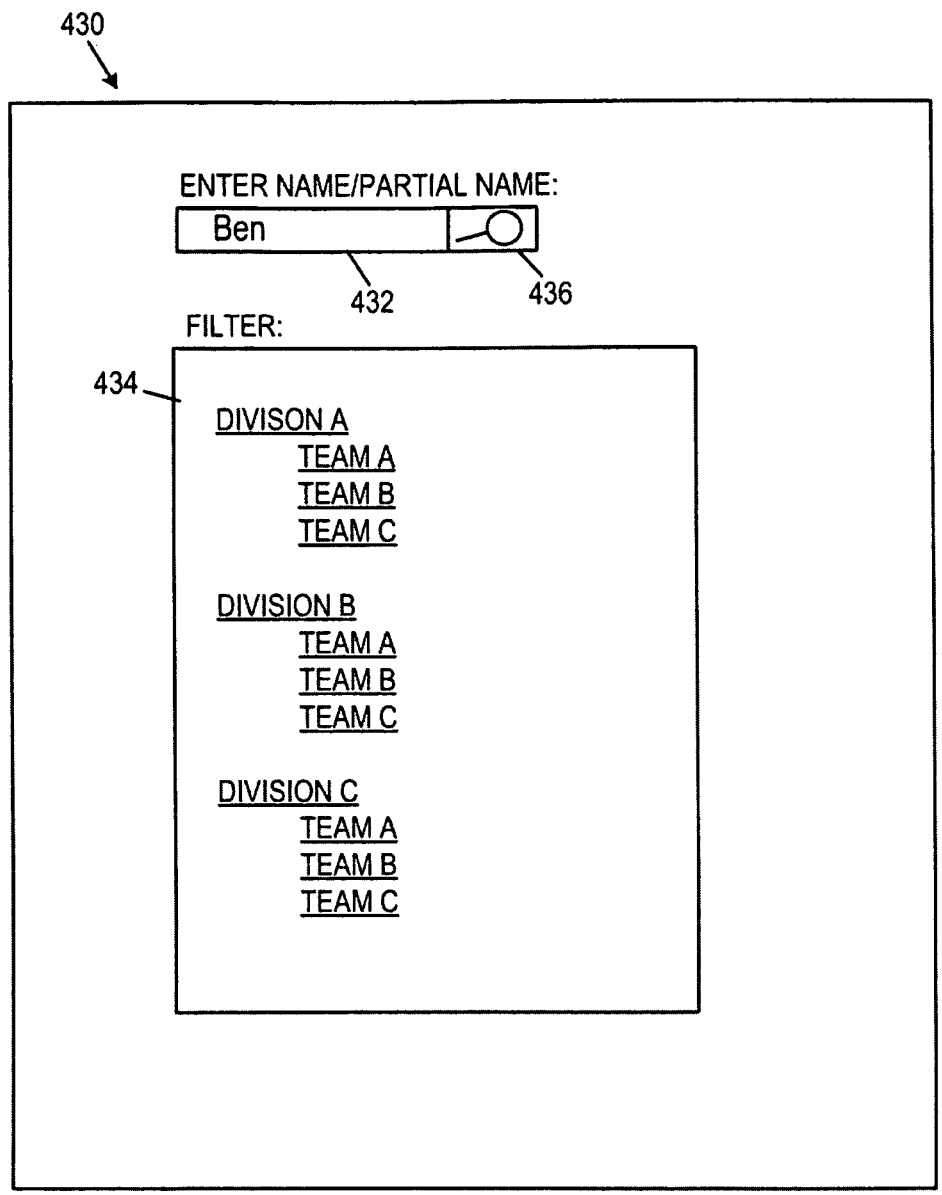
FIG. 11 is a simulated screen for one implementation that illustrates performing a search against a hierarchical chart.
Figure 12:
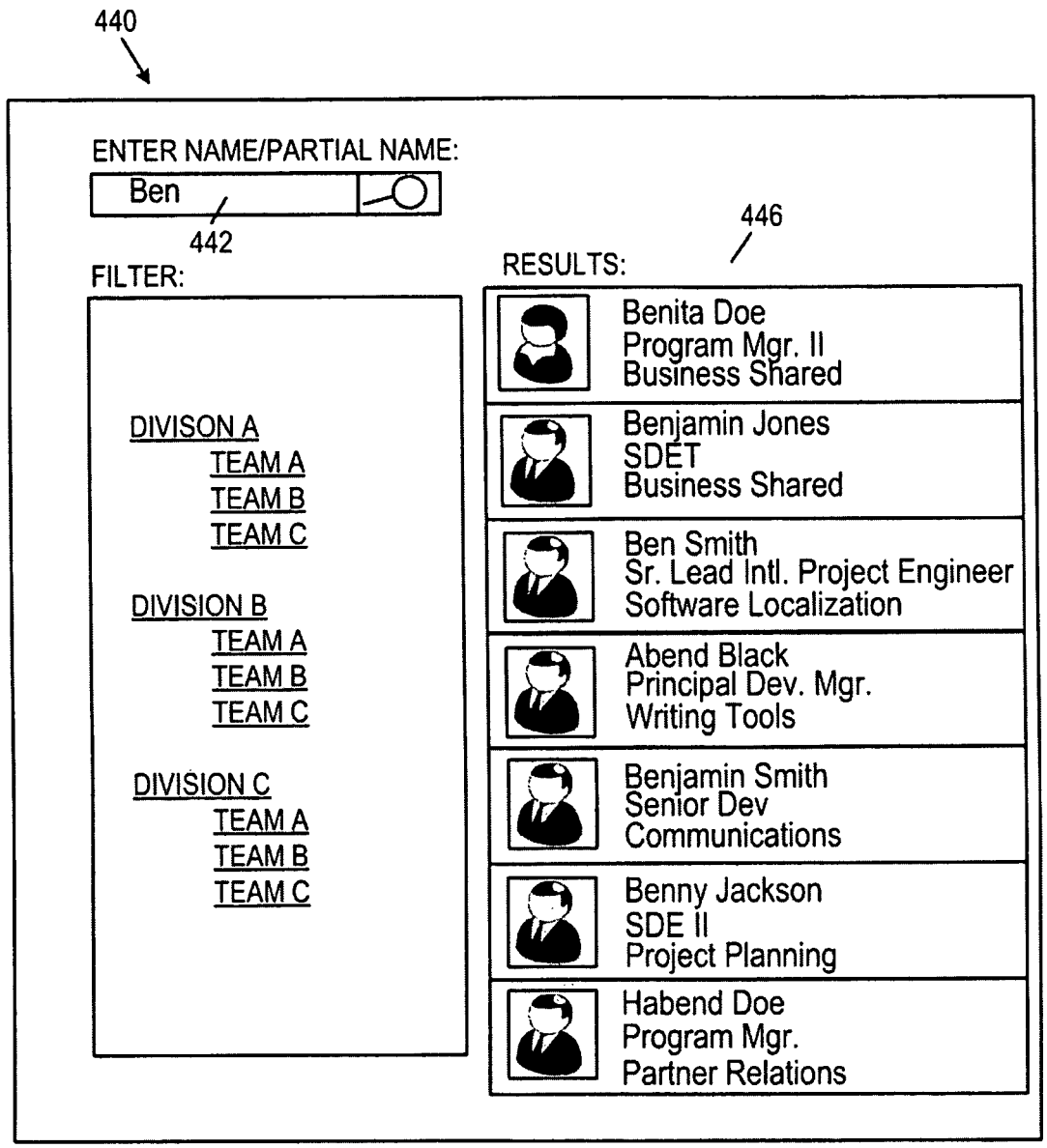
FIG. 12 is a simulated screen for one implementation that illustrates some results from performing the exemplary search shown in FIG. 11.

Turning now to FIGS. 11 and 12, examples will be shown for how searches can be performed to locate a particular entity of interest. FIG. 11 is a simulated screen 430 for one implementation that illustrates performing a search against a hierarchical chart. The user can enter a full or partial name into input box 432, and can optionally specify other filter criteria 434, such as to limit the search to a particular grouping of entities. In this example, a partial name "Ben" has been entered. To start the search, the user can select search option 436. A search is then performed to see if there are any entities in the hierarchical chart that match the specified criteria (which is "Ben").

A screen 440 similar to FIG. 12 is then displayed to show the results of the search. The entities that match the specified name 442 are then displayed in a search results list 446. The search results list 446 shows each result in a separate contact card, along with the entity's name, photo, title, and company division. In other implementations, some, additional, and/or other pieces of information for each entity could be shown.

Turning now to FIGS. 13-17, some example animations will be described. These animations can be used to visually indicate transitions from different entity views to the next. The use of animations can give the user a visual way of seeing the relationship between the current view and the new view, and/or it can also show progress while other data is being loaded for the updated display. Note that for the sake of simplicity, some parts of the hierarchical chart are not shown on these state transition diagrams. For example, when an animation is shown when transitioning from one peer to the next, these state transition diagrams may not show parent entities to make the example easier to follow. But in an actual implementation, parent, child, and/or peer entities could also be displayed at the time that animation is taking place.

Figure 13:
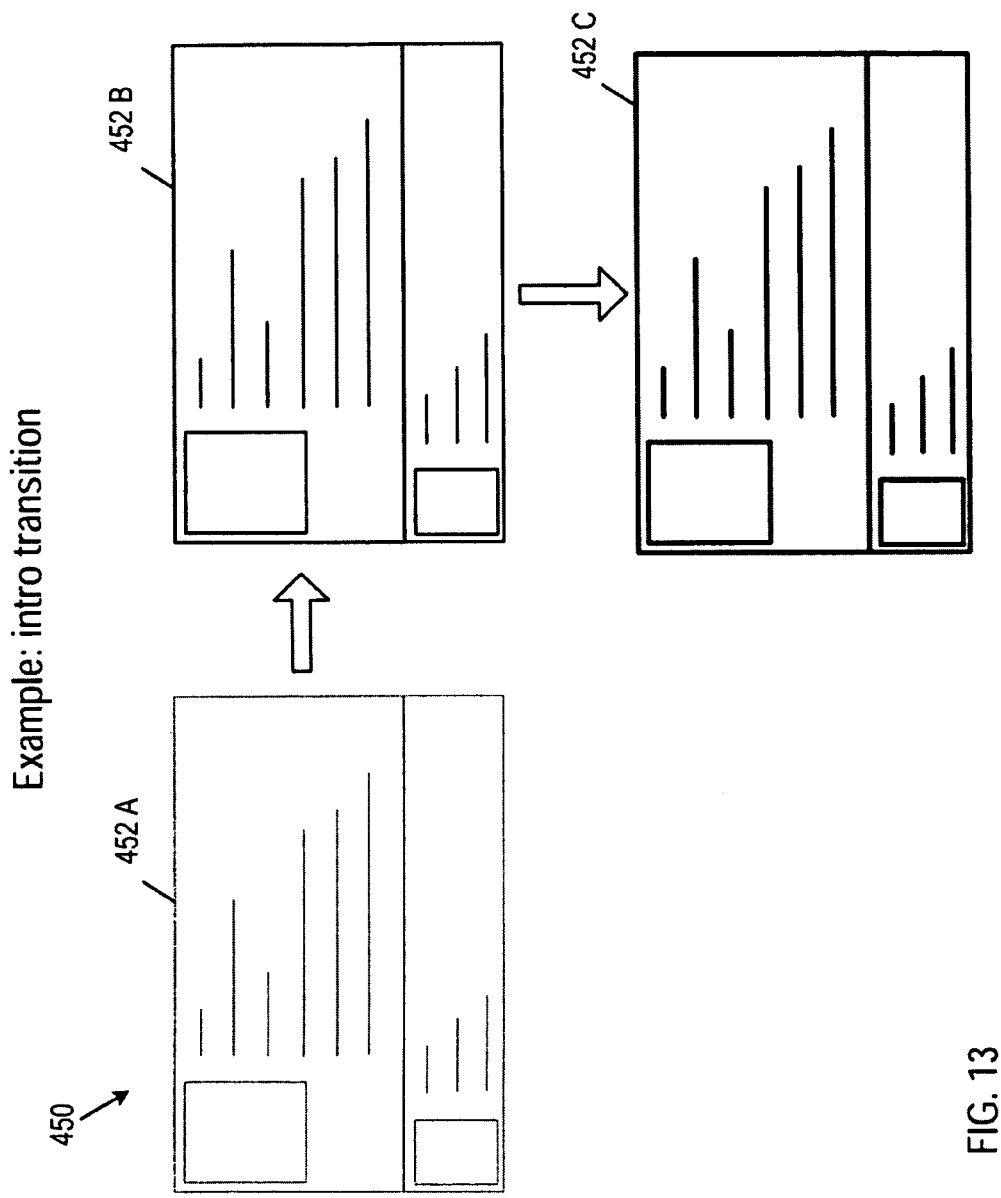
FIG. 13 is a state transition diagram that illustrates an exemplary animation that can be used for initially loading a hierarchical chart.

FIG. 13 is a state transition diagram 450 that illustrates an exemplary animation that can be used for initially loading a hierarchical chart, and/or for other transitions after the chart is loaded. In the example shown, a primary entity 452 is first displayed in a lighter visibility (at point 452A). As the primary entity 452 is further loaded onto the screen, each subsequent rendering (at points 452B and 452C) can be darker than the prior one.

Figure 14:
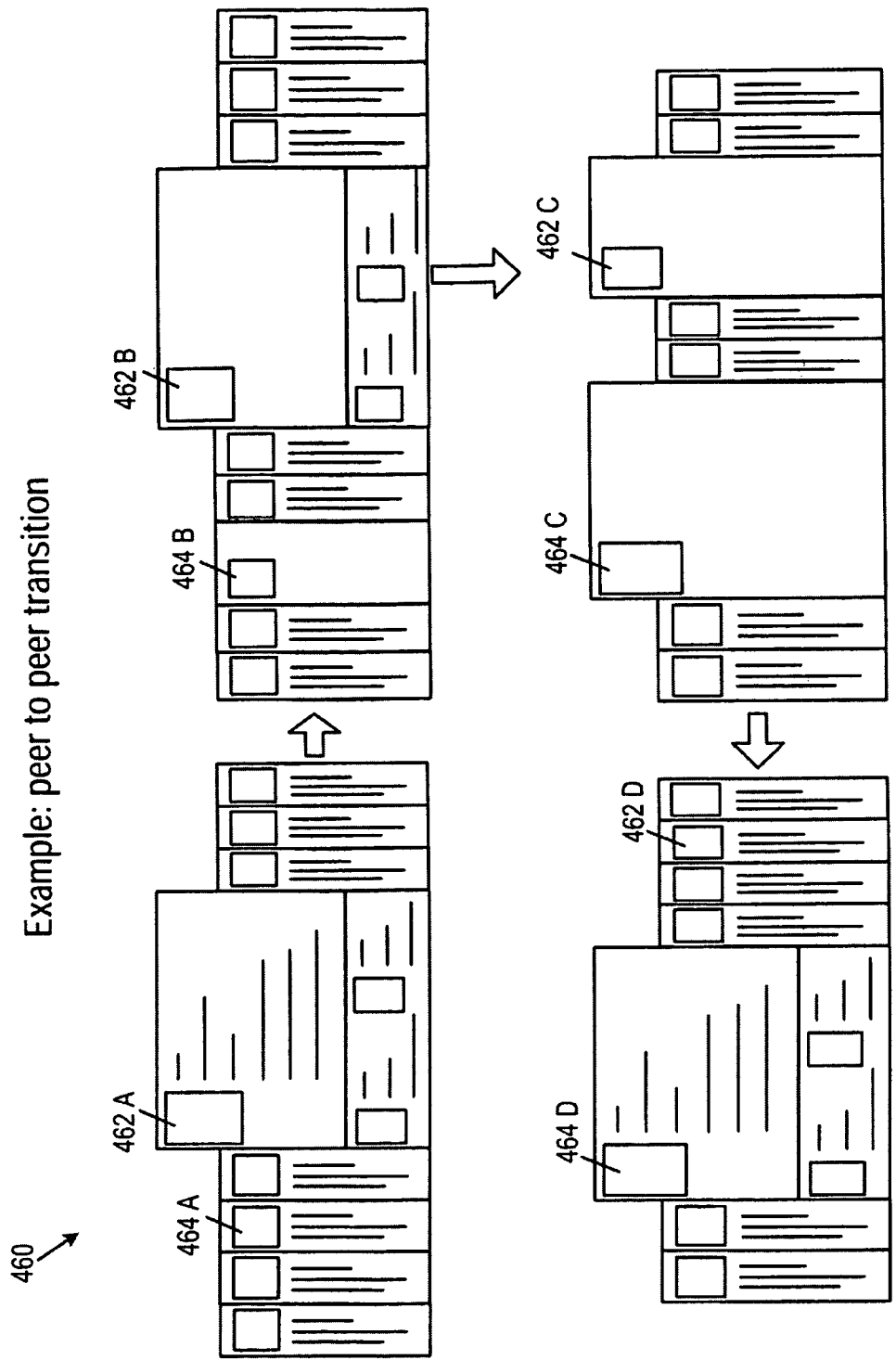
FIG. 14 is a state transition diagram that illustrates an exemplary animation that can be used for displaying peer to peer transitions.

FIG. 14 is a state transition diagram 460 that illustrates an exemplary animation that can be used for displaying peer to peer transitions. When the user selects a peer entity 464 that is a peer to the primary entity 462, then a series of animations are used to visually show how the primary entity turns into a peer entity, and how the peer entity turns into a primary entity. In the example shown, peer entity 464 is a peer to primary entity 462. Upon selecting peer entity 464, primary entity 462 starts to have less emphasis, and peer entity 464 starts to have more emphasis (from points A-D). For example, at point 462B, some of the contents of primary entity 462 are hidden from view. Peer entity 464 becomes more prominent, such as wider at point 464B. This process of making primary entity 462 less prominent and peer entity 464 more prominent continues until peer entity 464 becomes the new primary entity. For example, at point 462C, primary entity 462 becomes narrower, and at corresponding point 464C, the peer entity 464 becomes even wider. Then, at point 462D, the primary entity 462 is now a peer to the peer entity 464 (which has now become the new primary entity at point 464D).

Figure 15:
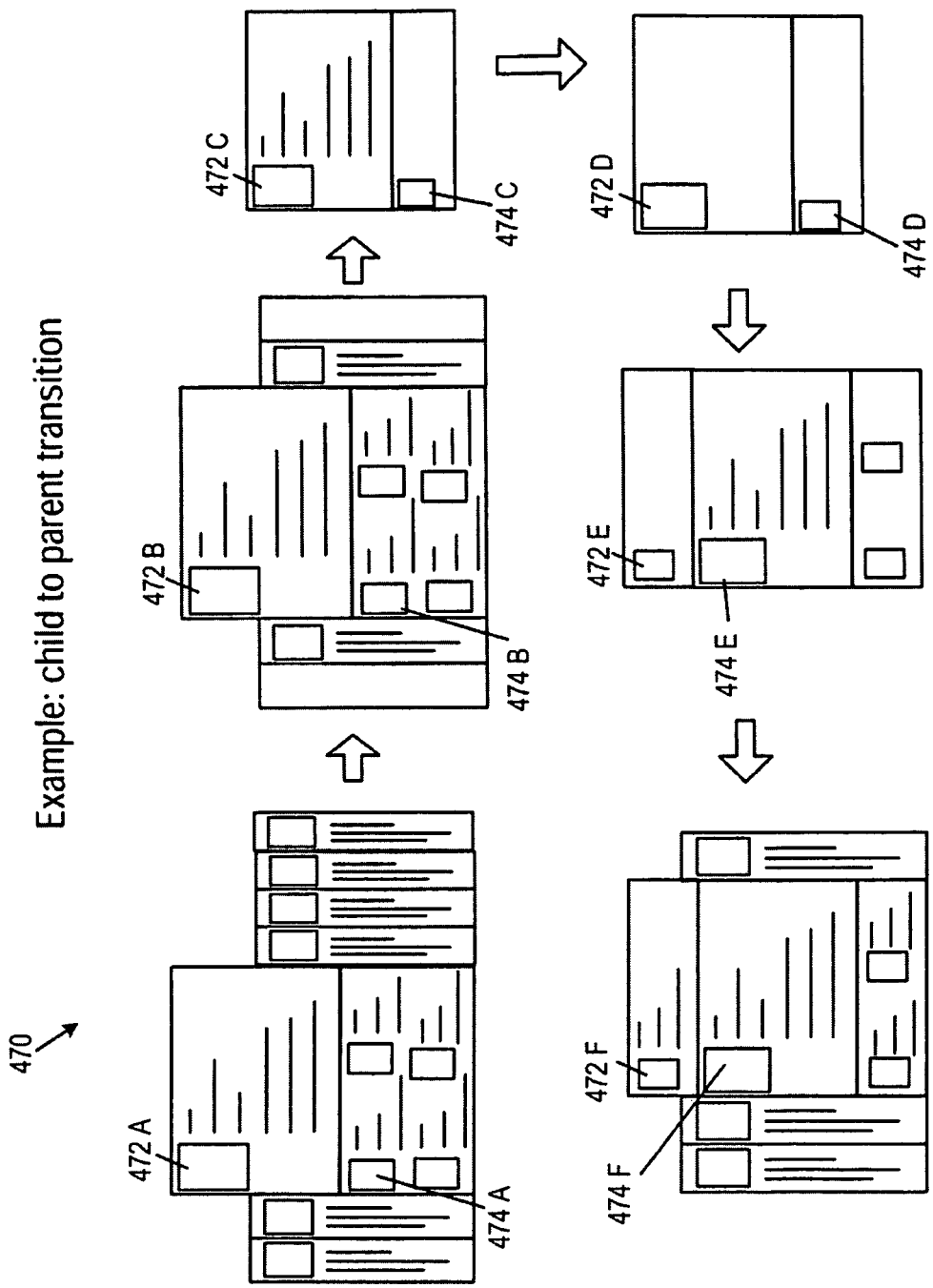
FIG. 15 is a state transition diagram that illustrates an exemplary animation that can be used for displaying child to parent transitions.

FIG. 15 is a state transition diagram 470 that illustrates an exemplary animation that can be used for displaying child to parent transitions. In this example, when the user selects child entity 474 that is a child to the current primary entity 472, then the animations begin to make the child entity 474 transition gradually into new primary entity (from points A-F). At point 472B, less emphasis is given to the peer entities, such as to hide some of them and fade others out. At point 472C, the primary entity 472 is made smaller, and the child entity 474C is made larger. At point 472D, more of the primary entity is hidden, and at point 474D, more of the child entity 474D is display. At point 472E, the primary entity 472 becomes a parent entity, and at point 474E, the child entity becomes the new primary entity. At the remaining points (472F and 474F), the diagram is restored to show all of the peers and children with the entities in their new location.

Figure 16:
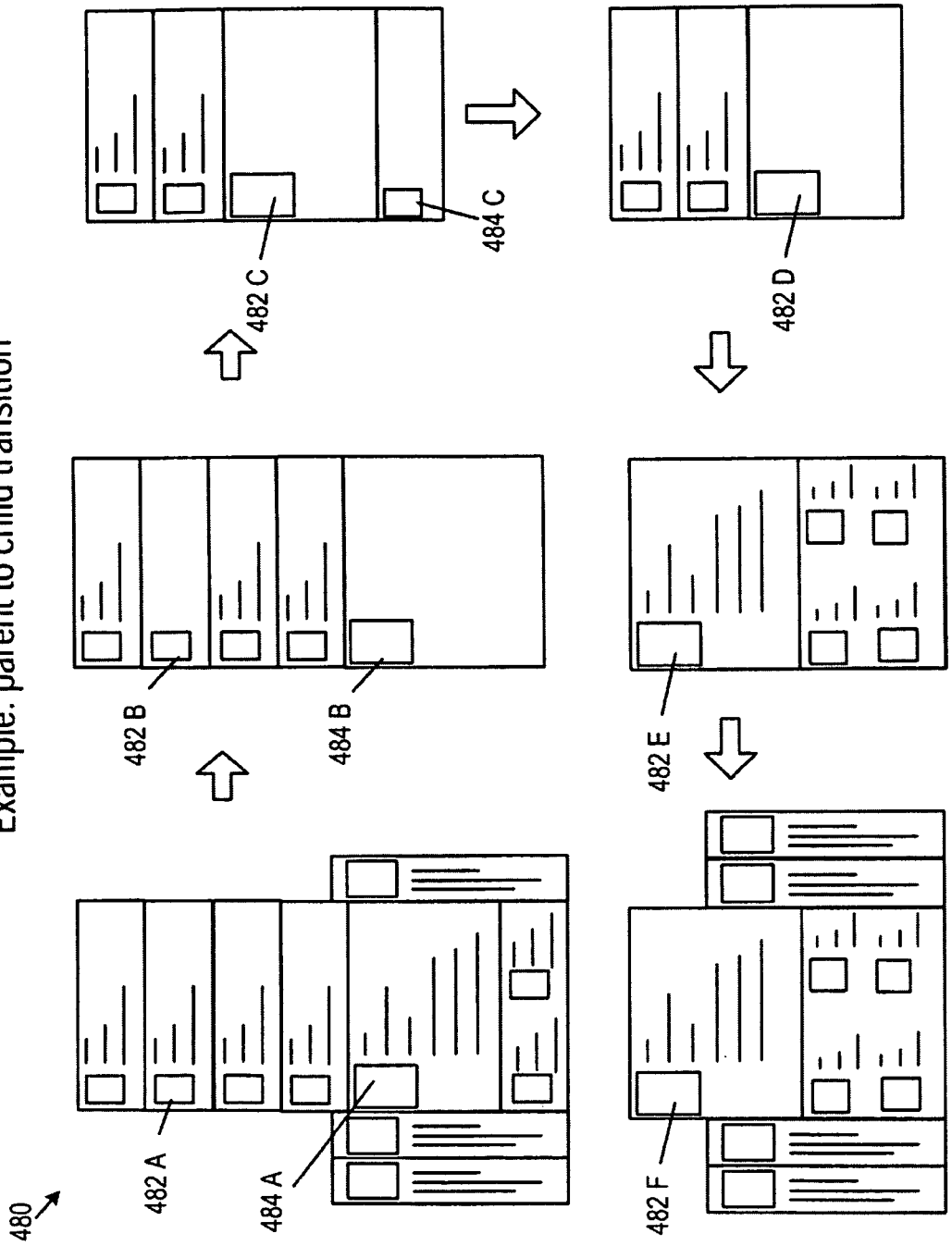
FIG. 16 is a state transition diagram that illustrates an exemplary animation that can be used for showing parent to child transitions.

FIG. 16 is a state transition diagram 480 that illustrates an exemplary animation that can be used for showing parent to child transitions. In this example, when the user selects parent entity 482 that is a parent to the current primary entity 484, then the animations begin to make the parent entity 482 transition gradually into new primary entity (from points A-F). At points 482B and 484B, respectively, the parent entity 482 is given more emphasis, and the primary entity 484B is made less visible. At point 484B, less emphasis is also given to the peer entities, such as to hide some of them and fade others out. At point 482C, the parent entity 482C is made bigger and becomes the new primary entity, and at the corresponding point 484C, the old primary entity is turned into a child entity. At the remaining points (482D-482F and 484D-484F), the diagram is restored to show all of the peers and children with the entities in their new location.

Figure 17:
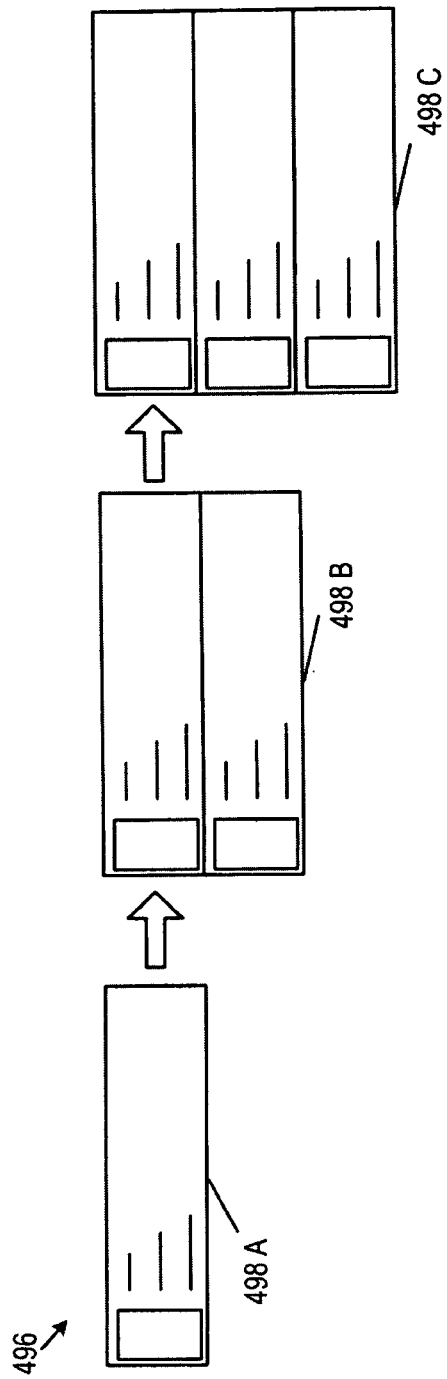
FIG. 17 is a state transition diagram that illustrates an exemplary animation that can be used for displaying search results from searching a hierarchical chart.

FIG. 17 is a state transition diagram 496 that illustrates an exemplary animation that can be used for displaying search results from searching a hierarchical chart. Search results are displayed in contact cards one at a time, such as shown at points 498A, 498B, and 498C, respectively. This gives a visual indication that more and more results are being loaded on the screen.

It will be appreciated that the animations described in FIGS. 13-18 are just non-limiting examples to illustrate various ways that transitions from entity to entity can be indicated visually. Some, all, additional, and/or other combinations of animations could also be used in other implementations.

Figure 18:
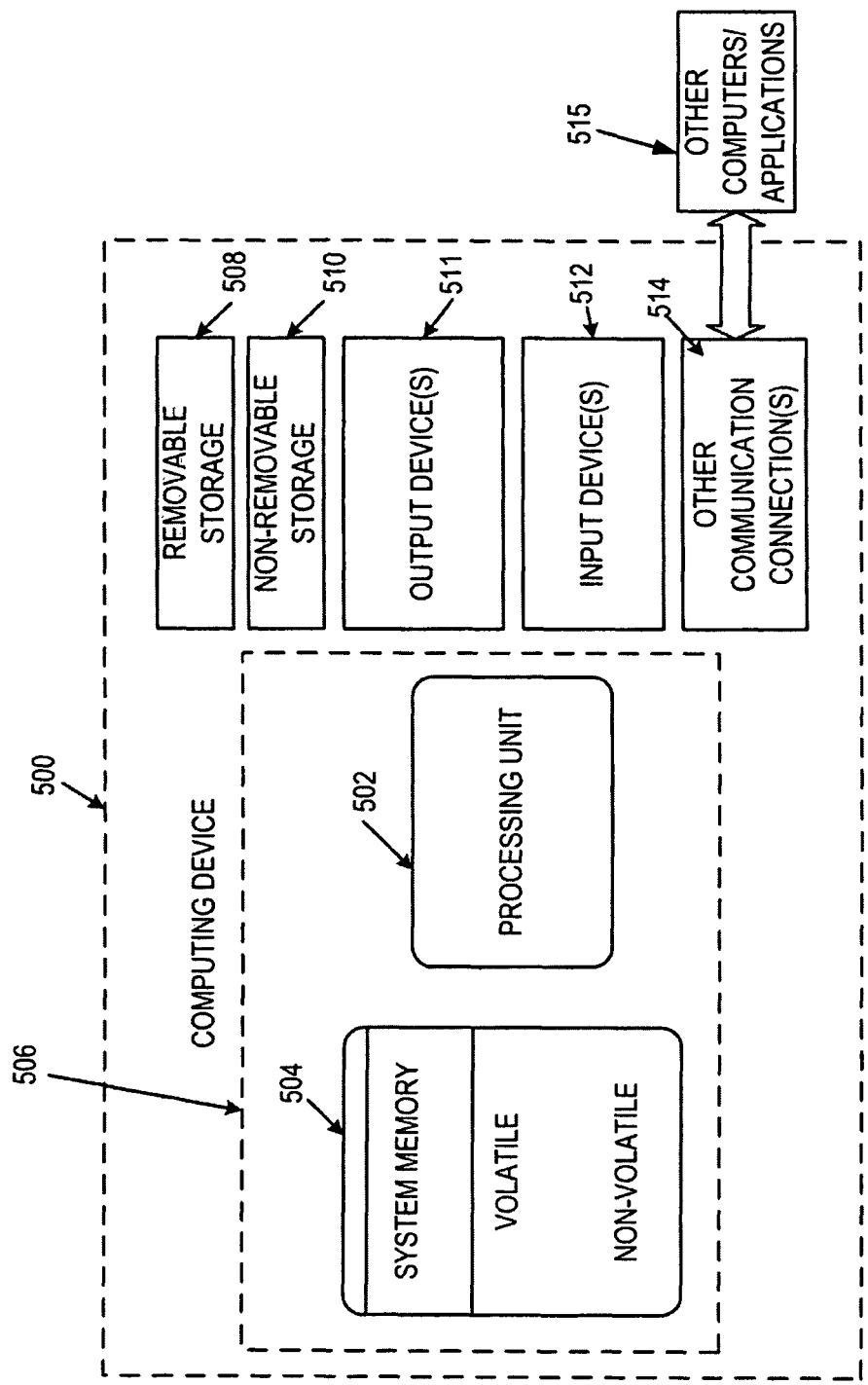
FIG. 18 is a diagrammatic view of a computer system of one implementation.

As shown in FIG. 18, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 18 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 18 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method for displaying a hierarchical chart comprising the steps of:
   displaying at least a portion of a hierarchical chart on a display, with a primary entity being displayed in a center region of the display, with one or more peers to the primary entity being displayed along a horizontal axis in comparison to the primary entity, each of the one or more peers being associated with an image, the image of each of the one or more peers being displayed with a top of the image oriented up, each of the one or more peers being associated with text, each of the individual characters of the text being displayed with the top of the individual characters oriented to a side, with one or more parents to the primary entity being displayed above the primary entity, and with one or more children to the primary entity being displayed beneath the primary entity;
   receiving a selection of a different entity on the hierarchical chart than the primary entity, the different entity being positioned on a first axis relative to the primary entity; and transitioning to the different entity to make the different entity become the primary entity that is displayed in the center region, transitioning including:
  fading out a first set of one or more entities associated with the primary entity and positioned on a second axis relative to the primary entity, the second axis being orthogonal to the first axis,
  repositioning the different entity to the center region of the screen, repositioning the different entity to the center region of the screen including displaying the different entity at points between a first position of the different entity when the different entity is selected and the center region of the screen,
  fading in a second set of one or more entities associated with the different entity and positioned on the second axis relative to the different entity, and
  when the different entity is one of the one or more peers, redisplaying each of the individual characters of the text associated with the different entity with the top of the individual characters oriented up.

2. The method of claim 1, wherein the primary entity is displayed in a contact card in the center region.

3. The method of claim 2, wherein the one or more children are displayed beneath the primary entity but as part of the contact card.

4. The method of claim 1, wherein the hierarchical chart including filled and unfilled positions.

5. The method of claim 1, wherein transitioning includes:
resizing the primary entity from a first size to a second size, the first size being indicative of being a focus of attention, the second size being indicative of not being the focus of attention, resizing including resizing the primary entity to a plurality of sizes between the first size and the second size.

6. The method of claim 1, wherein transitioning includes:
resizing the different entity from a first size to a second size, the first size being indicative of being a focus of attention, the second size being indicative of not being the focus of attention, resizing including resizing the different entity to a plurality of sizes between the first size and the second size.

7. The method of claim 1, wherein at least one animation is used when the primary entity is first loaded in the center region.

8. The method of claim 1, wherein at least one animation is used when a selected peer entity is being transitioned to become the primary entity.

9. The method of claim 1, wherein at least one animation is used when a selected parent entity is being transitioned to become the primary entity.

10. The method of claim 1, wherein at least one animation is used when a selected child entity is being transitioned to become the primary entity.

11. The method of claim 1, wherein the primary entity is a person in an organization that is being represented in the hierarchical chart.

12. The method of claim 1, wherein the primary entity is a particular team within an organization that is being represented in the hierarchical chart.

13. A method for performing searches against a hierarchical chart comprising the steps of:
  receiving input of at least a portion of a name to search for in a hierarchical chart;
  receiving a selection of a filter criteria;
  performing a search against the hierarchical chart to find one or more matching records that match the name and the filter criteria;
  displaying the one or more matching records, with at least a name and photo being displayed for each of the matching records;
  receiving a selection of a primary entity from the one or more matching records;
  displaying at least a portion of a hierarchical chart on a display, with the primary entity being displayed in a center region of the display, with one or more peers to the primary entity being displayed along a horizontal axis in comparison to the primary entity, each of the one or more peers being associated with an image, the image of each of the one or more peers being displayed with a top of the image oriented up, each of the one or more peers being associated with text, each of the individual characters of the text being displayed with the top of the individual characters oriented to a side, with one or more parents to the primary entity being displayed above the primary entity, and with one or more children to the primary entity being displayed beneath the primary entity;
  receiving a selection of a different entity on the hierarchical chart than the primary entity, the different entity being positioned on a first axis relative to the primary entity; and
  transitioning to the different entity to make the different entity become the primary entity that is displayed in the center region, transitioning including:
    fading out a first set of one or more entities associated with the primary entity and positioned on a second axis relative to the primary entity, the second axis being orthogonal to the first axis,
    repositioning the different entity to the center region of the screen, repositioning the different entity to the center region of the screen including displaying the different entity at points between a first position of the different entity when the different entity is selected and the center region of the screen,
    fading in a second set of one or more entities associated with the different entity and positioned on the second axis relative to the different entity, and
    when the different entity is one of the one or more peers, redisplaying each of the individual characters of the text associated with the different entity with the top of the individual characters oriented up.

14. The method of claim 13, wherein the one or more matching records are displayed in separate contact cards.

15. The method of claim 13, wherein the filter criteria includes selection of a specific group within an organization that is being represented in the hierarchical chart.

16. The method of claim 13, wherein a job title is also displayed for each of the matching records.

17. A computer storage medium, the computer storage medium not consisting of a propagating signal per se, storing computer-executable instructions for causing a computer to perform steps comprising:
  displaying at least a portion of a hierarchical chart on a display, with a primary entity being displayed in a contact card in a center region of the display, with one or more peers to the primary entity being displayed along a horizontal axis in comparison to the primary entity, with one or more parents to the primary entity being displayed above the primary entity, and with one or more children to the primary entity being displayed beneath the primary entity, displaying including:
    displaying at least a portion of text of the contact card horizontally, and displaying at least a portion of text of a first peer of the one or more peers with each character displayed with the top of the character oriented to a side while displaying an image of the first peer with a top of the image oriented up; and upon receiving a selection of the first peer, redisplaying the portion of text of the first peer with the top of each character oriented up.

18. The computer storage medium of claim 17, wherein the one or more children are displayed as part of the contact card, but beneath the primary entity.

19. The computer storage medium of claim 17, further having computer-executable instructions for causing a computer to perform steps comprising:

upon receiving a selection of a different entity on the hierarchical chart than the primary entity, transitioning to the different entity to make the different entity become the primary entity that is displayed in the contact card in the center region.

20. The computer storage medium of claim 19, wherein the transitioning step further comprises using at least one animation to visually indicate that the different entity is becoming the primary entity shown in the contact card in the center region.

* * * * *